H. LAWRENCE.
STOVE LID LIFTER.
APPLICATION FILED APR. 23, 1913.

1,103,780.

Patented July 14, 1914.

Inventor
Harry Lawrence
By Victor J. Evans
Attorney

Witnesses

UNITED STATES PATENT OFFICE.

HARRY LAWRENCE, OF CALLAWAY, MINNESOTA.

STOVE-LID LIFTER.

1,103,780.  Specification of Letters Patent.  Patented July 14, 1914.

Application filed April 23, 1913. Serial No. 763,103.

*To all whom it may concern:*

Be it known that I, HARRY LAWRENCE, a citizen of the United States, residing at Callaway, in the county of Becker and State of Minnesota, have invented new and useful Improvements in Stove-Lid Lifters, of which the following is a specification.

This invention relates to implements for handling stove lids and the like, and it has for its object to produce a simple and efficient implement whereby the center piece and two adjacent lids may be simultaneously lifted and manipulated.

A further object of the invention is to produce an implement of the class described which may be utilized for a variety of other purposes in connection with a stove, such as a grate wrench, a poker and the like.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

Figure 1:
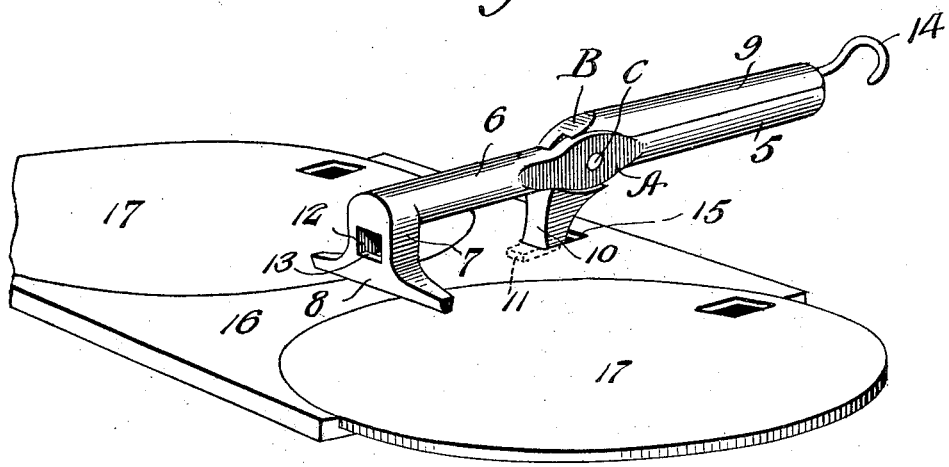
Figure 2:
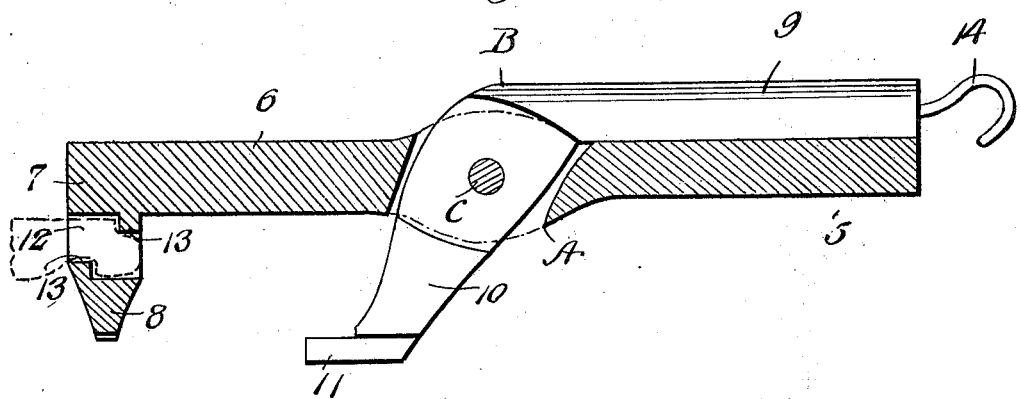
Figure 3:
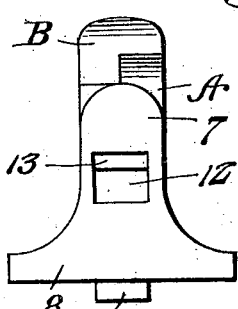

In the drawing,—Figure 1 is a perspective view showing the application of the improved implement to a center piece and two lids, portions of which are shown. Fig. 2 is a longitudinal sectional view of the implement. Fig. 3 is a front end view.

Corresponding parts in the several figures are denoted by like characters of reference.

The improved implement is composed of pivotally connected members A and B, each of which is apertured for the passage of the pivotal connecting member C. The member A includes a handle portion 5 and a jaw portion 6, the latter having a head 7 including a cross bar 8. The member B includes a handle portion 9 and a jaw portion 10 which extends at an angle to the jaw portion 6 of the member A and which has a terminal lug 11 that extends in the direction of the cross bar 8. The head 7 at the end of the jaw portion 6 has an angular aperture 12 adapted to engage the customary shaking bar of a stove grate, as indicated in dotted lines in Fig. 2, said aperture being provided at diagonally opposite ends with flange portions 13 adapted to grip the shaker bar by bearing down on the handle portion of the implement.

A hook 14 by means of which the implement may be suspended is connected with the handle portion 9 of the member B.

It will be readily seen that by placing the lug 11 in engagement with the notch 15 of an ordinary stove center piece 16 and compressing the handle portions 5 and 9, the cross bar 8 will be caused to bear down on the lids 17, thus enabling said lids to be lifted, together with the center piece. The implement may be conveniently utilized as a poker and also as a stove wrench for the purpose of shaking the grate.

A particular advantage of this invention resides in the fact that when the device is utilized for picking up either a single lid or a cross piece with or without the lids, the cross bar 8 will, by bearing down on the parts that are being lifted, press down equally on both sides thereof and hold the parts with a firm grip, preventing swinging which frequently happens when an ordinary lid lifter is used and results in the lid or cross bar being dropped to the great inconvenience of the operator, especially when the parts are hot and sooty. This device grips the parts firmly and holds them steady and without swaying while being transferred from one place to another.

Having thus described the invention, what is claimed as new, is:—

An implement of the class described comprising pivotally connected members, one of which has a jaw portion provided with a terminal lug, the other member having a jaw portion provided with a terminal head having a cross bar, said head being also provided with an angular aperture having flanges at diagonally opposite corners.

In testimony whereof I affix my signature in presence of two witnesses.

HARRY LAWRENCE.

Witnesses:
 E. R. PHIPPS,
 H. J. RUTH.

---

Copies of this patent may be obtained for five cents each, by addressing the "Commissioner of Patents, Washington, D. C."